US012001839B2

(12) United States Patent
Yune

(10) Patent No.: US 12,001,839 B2
(45) Date of Patent: Jun. 4, 2024

(54) METHOD FOR REPLICATING A PROJECT SERVER FOR TROUBLE-SHOOTING AND A CLOUD DEVELOPMENT PLATFORM SYSTEM USING THE SAME

(71) Applicant: SDT Inc., Seoul (KR)

(72) Inventor: Jiwon Yune, Gwacheon-si (KR)

(73) Assignee: SDT INC., Seoul (KR)

( * ) Notice: Subject to any disclaimer, the term of this patent is extended or adjusted under 35 U.S.C. 154(b) by 0 days.

(21) Appl. No.: 17/793,858

(22) PCT Filed: Apr. 25, 2022

(86) PCT No.: PCT/KR2022/005883
§ 371 (c)(1),
(2) Date: Jul. 19, 2022

(87) PCT Pub. No.: WO2022/234995
PCT Pub. Date: Nov. 10, 2022

(65) Prior Publication Data
US 2023/0350671 A1 Nov. 2, 2023

(30) Foreign Application Priority Data
May 4, 2021 (KR) .......................... 10-2021-0058045

(51) Int. Cl.
*G06F 8/77* (2018.01)
*G06F 8/35* (2018.01)
*G06F 11/36* (2006.01)
(52) U.S. Cl.
CPC .................. *G06F 8/77* (2013.01); *G06F 8/35* (2013.01); *G06F 11/3664* (2013.01)

(58) Field of Classification Search
CPC ........... G06F 8/35; G06F 8/77; G06F 11/3664
(Continued)

(56) References Cited

U.S. PATENT DOCUMENTS 6,615,253 B1 * 9/2003 Bowman-Amuah ........................ G06F 16/9574 709/219
8,781,924 B2 * 7/2014 Bang ......................... G06F 8/20 705/30

(Continued)

FOREIGN PATENT DOCUMENTS

| CN | 101866315 A | * | 10/2010 |
| CN | 102088367 A | * | 6/2011 |

(Continued)

OTHER PUBLICATIONS

Text Translation for all listed Foreign Patent Documents.*

*Primary Examiner* — Francisco J Aponte
(74) *Attorney, Agent, or Firm* — Birch, Stewart, Kolasch & Birch, LLP

(57) ABSTRACT

Disclosed is a cloud development platform system including: a project server including an issue management unit managing histories of all issues which occur in the middle of performing a development project; a project management server including a project replication unit; and an issue management server providing a first issue selected by a developer of the development project among all issues which occur in the project server in the middle of performing the development project to the project management server. The project replication unit is configured to generate a replicated server replicating all data of an OS of the project server generating the first issue and an upper layer of the OS.

9 Claims, 5 Drawing Sheets

(58) Field of Classification Search
USPC ......................................................... 717/103
See application file for complete search history.

(56) References Cited

U.S. PATENT DOCUMENTS

| | | | | |
|---|---|---|---|---|
| 9,170,784 | B1* | 10/2015 | Friedman | G06F 11/3688 |
| 9,952,782 | B1* | 4/2018 | Chandrasekaran | G06F 3/0607 |
| 10,970,150 | B1* | 4/2021 | Hunter | G06F 11/0754 |
| 11,010,266 | B1* | 5/2021 | Blaszka | G06F 11/2092 |
| 11,030,555 | B2* | 6/2021 | Bar-on | G06Q 10/063114 |
| 11,132,285 | B1* | 9/2021 | Sukhyani | G06F 11/3692 |
| 11,243,830 | B2* | 2/2022 | Hunter | G06Q 10/0635 |
| 11,271,796 | B2* | 3/2022 | Tapia | H04W 24/04 |
| 11,308,417 | B2* | 4/2022 | Vichare | G06F 11/3089 |
| 11,461,206 | B2* | 10/2022 | Roll | G06F 11/2289 |
| 11,494,179 | B1* | 11/2022 | Paramasivan | G06F 11/1451 |
| 11,507,493 | B1* | 11/2022 | Windh | G06F 9/3851 |
| 2005/0216486 | A1* | 9/2005 | Barshefsky | G06F 8/65 |
| 2008/0147693 | A1* | 6/2008 | Clemm | G06F 9/44505 |
| 2011/0029956 | A1 | 2/2011 | Ledenev et al. | |
| 2013/0174151 | A1* | 7/2013 | Nakajima | G06F 9/461 718/1 |
| 2016/0253167 | A1* | 9/2016 | Zamir | H04L 67/131 717/173 |
| 2017/0220451 | A1* | 8/2017 | Mankovskii | G06F 11/3648 |
| 2017/0322781 | A1* | 11/2017 | Schreder | G06F 8/30 |
| 2018/0165086 | A1* | 6/2018 | Prakash | H04L 67/34 |
| 2018/0203689 | A1* | 7/2018 | Murugesan | G06F 8/71 |
| 2019/0205110 | A1* | 7/2019 | Liu | G06F 8/48 |
| 2019/0220255 | A1 | 7/2019 | Taniguchi | |
| 2019/0370471 | A1* | 12/2019 | Petratos | G06F 8/71 |
| 2020/0004529 | A1* | 1/2020 | Ravipati | H04L 41/0813 |
| 2020/0184355 | A1* | 6/2020 | Mehta | G06F 11/3476 |
| 2020/0210934 | A1* | 7/2020 | Bar-On | G06F 8/20 |
| 2020/0218533 | A1* | 7/2020 | Sharma | G06F 8/77 |
| 2021/0004312 | A1* | 1/2021 | Tanaka | G06Q 10/101 |
| 2021/0042180 | A1* | 2/2021 | Sutton | G06F 11/0727 |
| 2021/0349859 | A1* | 11/2021 | Bafna | G06F 3/067 |
| 2021/0397495 | A1* | 12/2021 | Prakash | G06F 11/008 |
| 2021/0397527 | A1* | 12/2021 | Purushothaman | G06F 9/44505 |
| 2021/0406008 | A1* | 12/2021 | Maleki | G06F 9/3842 |
| 2022/0222170 | A1* | 7/2022 | Jones | G06F 8/433 |
| 2022/0261242 | A1* | 8/2022 | Pakiteeri | G06F 8/30 |
| 2022/0299981 | A1* | 9/2022 | Ohlsen | G06F 8/36 |
| 2022/0334837 | A1* | 10/2022 | Sa | G06F 8/34 |
| 2023/0032901 | A1* | 2/2023 | Tarocchi | G06F 8/71 |
| 2023/0259431 | A1* | 8/2023 | Jain | G06F 11/2048 714/4.11 |
| 2023/0269294 | A1* | 8/2023 | Sharma | H04L 67/1051 709/223 |

FOREIGN PATENT DOCUMENTS

| | | | | |
|---|---|---|---|---|
| CN | 104965775 | B | * | 2/2018 |
| CN | 115016801 | A | * | 9/2022 |
| CN | 115586919 | A | * | 1/2023 |
| CN | 115629746 | A | * | 1/2023 |
| JP | 2009104393 | A | * | 5/2009 |
| JP | 2011-521328 | A | | 7/2011 |
| JP | 2013084276 | A | * | 5/2013 ........... G06F 9/4445 |
| JP | 2018-55588 | A | | 4/2018 |
| JP | 2018-142076 | A | | 9/2018 |
| KR | 10-2009-0049292 | A | | 5/2009 |
| KR | 10-2019-0134135 | A | | 12/2019 |

* cited by examiner

[FIG. 1]
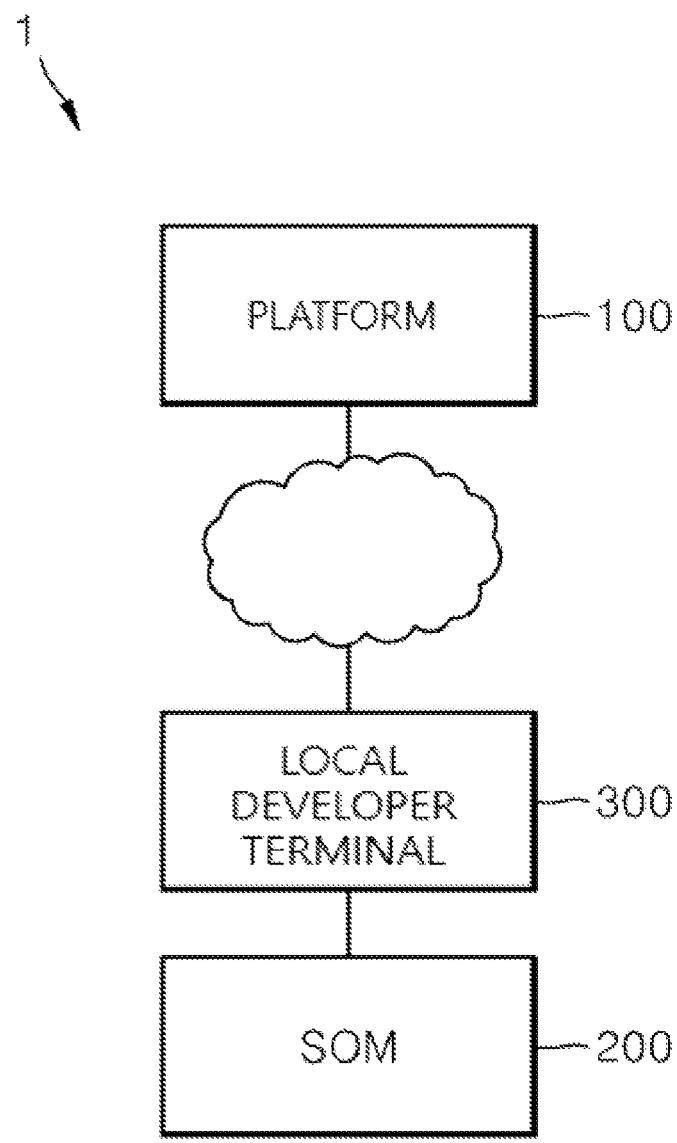

[FIG. 2]
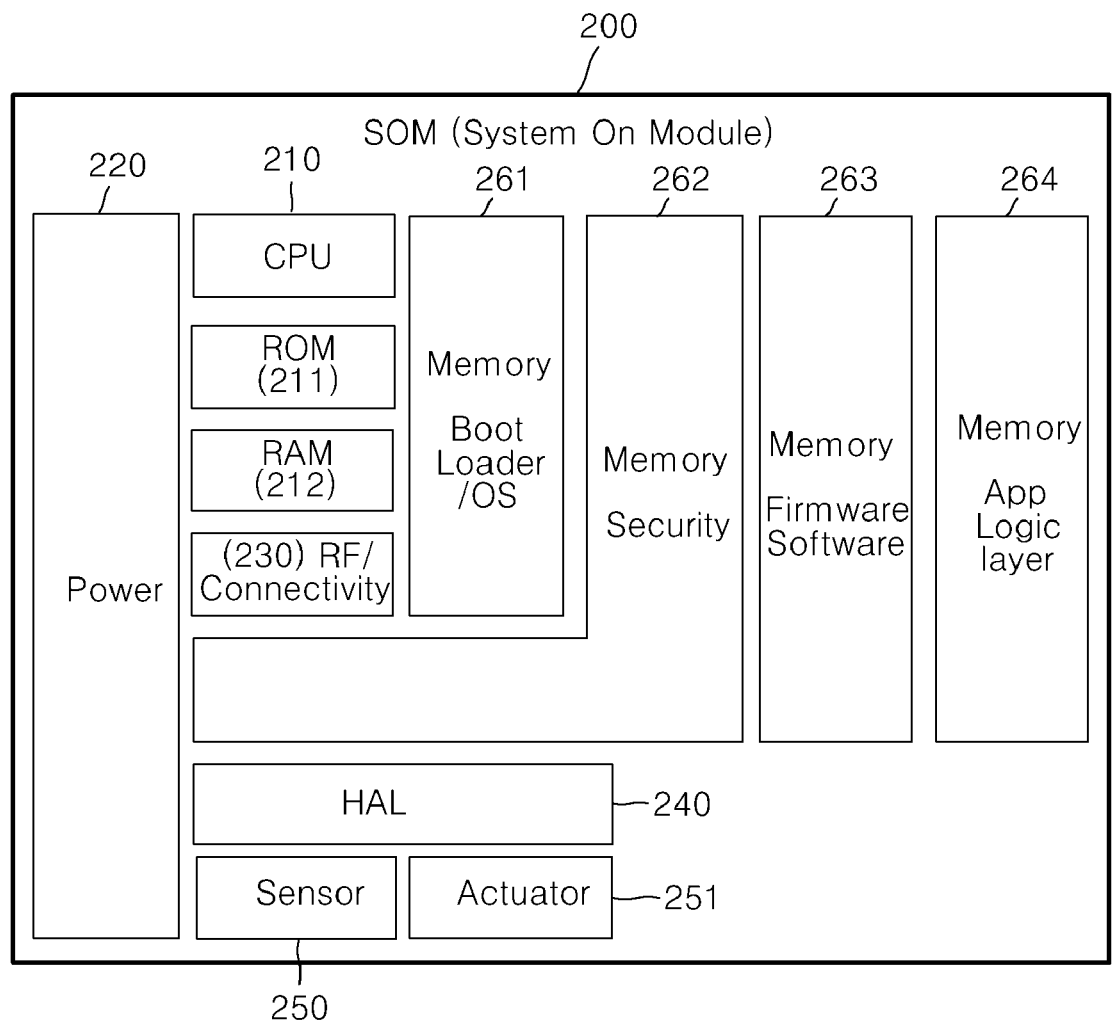

[FIG. 3]
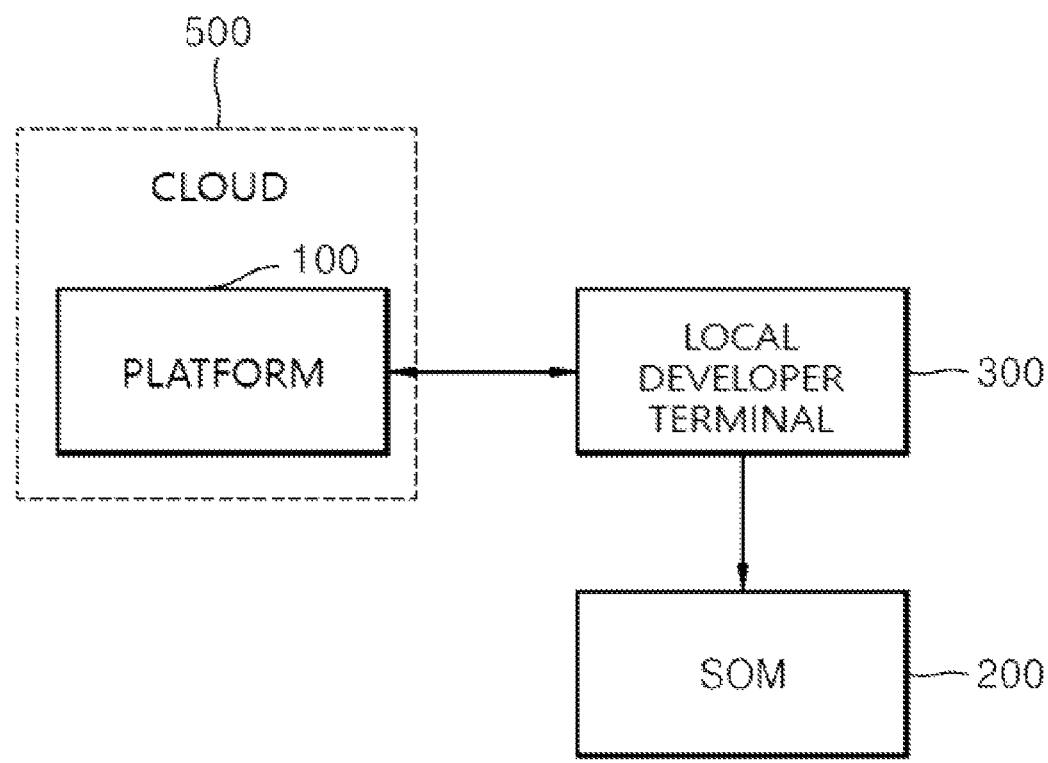

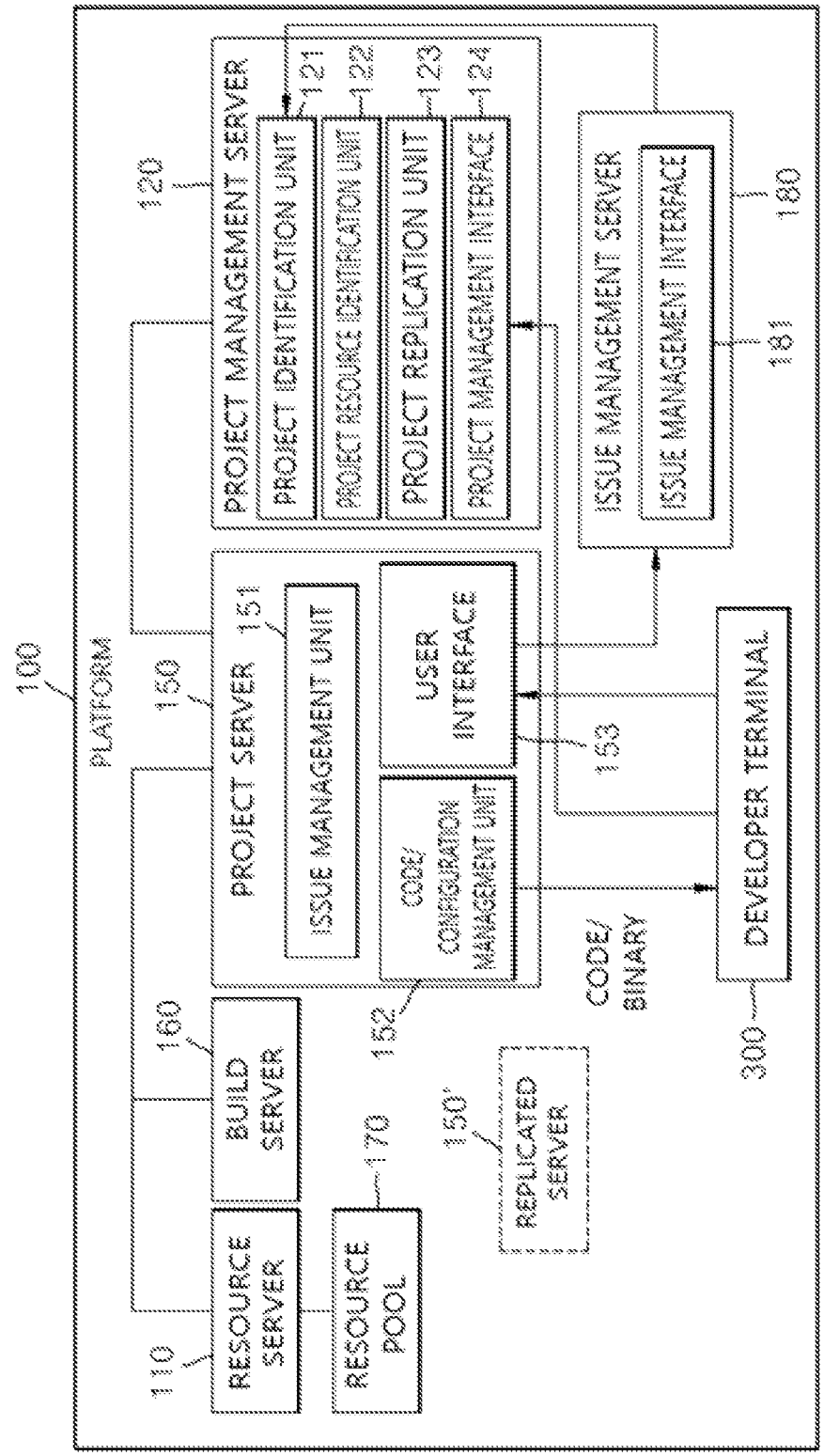
[FIG. 4]

[FIG. 5]
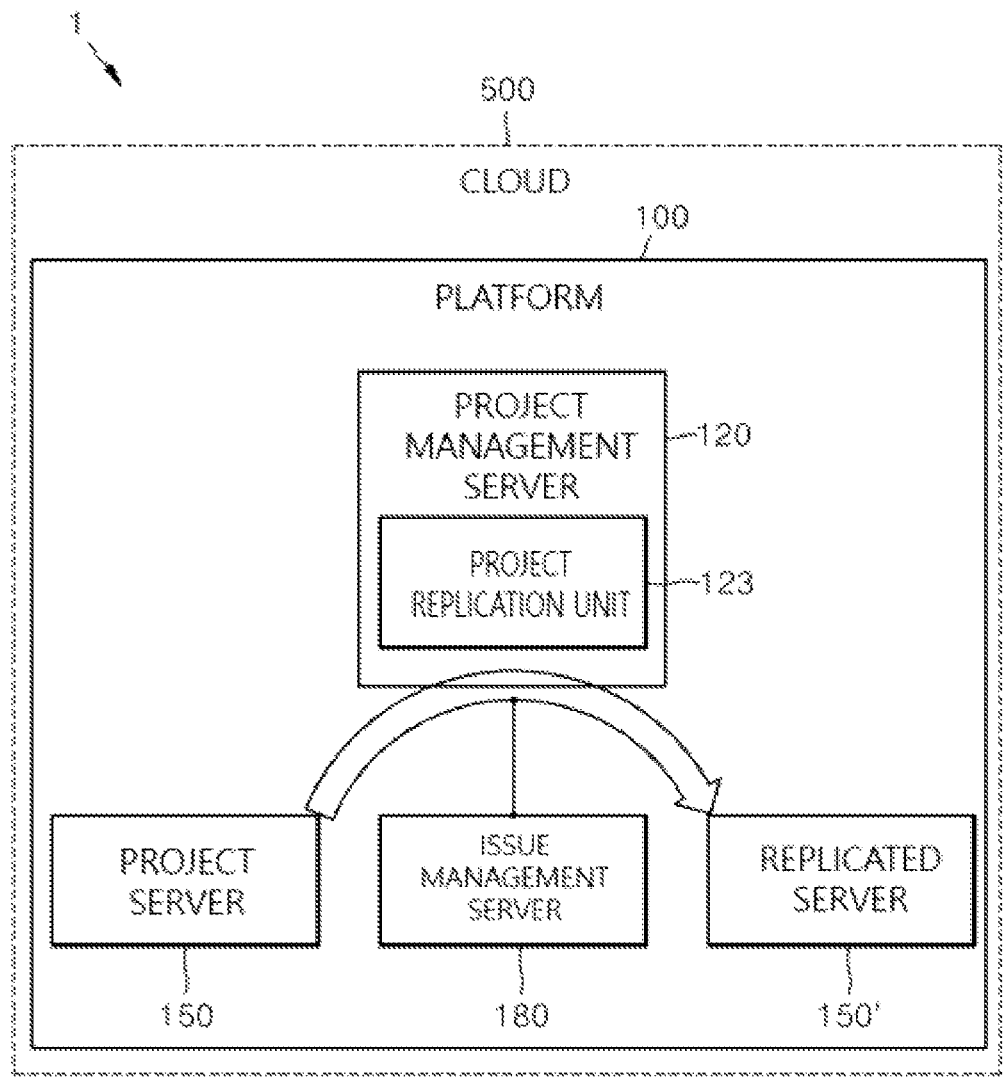

METHOD FOR REPLICATING A PROJECT SERVER FOR TROUBLE-SHOOTING AND A CLOUD DEVELOPMENT PLATFORM SYSTEM USING THE SAME

CROSS REFERENCE TO RELATED APPLICATIONS

This application is the National Phase of PCT International Application No. PCT/KR2022/005883, filed on Apr. 25, 2022, which claims priority under 35 U.S.C. 119(a) to Patent Application No. 10-2021-0058045, filed in the Republic of Korea on May 4, 2021, all of which are hereby expressly incorporated by reference into the present application.

TECHNICAL FIELD

The present invention relates to a technology that supports a development environment of a developer of a device having a computing function, and particularly, to a cloud platform technology that provides a resource constituted by a combination of hardware and firmware function packets which are reusable.

BACKGROUND ART

Software developers are fostered due to changes in an industrial structure, but engineers with hardware development capabilities are decreasing in the human resources market. However, since all software is based on hardware, the importance of a hardware development capability has not been reduced at all.

It is difficult to acquire hardware development methodology because of completing a higher curriculum, and the hardware development methodology tends to be transferred to apprenticeship in actual industrial fields. Eventually, the obstacles in the development of new products became the hardware development ability.

Meanwhile, a process installing firmware, OS, and drivers on the SOM by a software engineer with a hardware module like System on Module is also difficult is also difficult, and even if this process has passed, there are various issues related to hardware even in a process of building an application program which the software engineer intends to develop.

When the issues occur, even if analysis of the issues is requested to an external hardware expert, all development environments and histories up to the occurrence of the issues are transferred to the hardware expert, and as a result, there is a problem in that the analysis request cannot quickly bear fruit.

DISCLOSURE

Technical Problem

The present invention has been made in an effort to provide a cloud development platform technology for supporting trouble-shooting of a software developer which is vulnerable to hardware development.

Technical Solution

According to an aspect of the present invention, a cloud development platform system may be provided. A cloud development platform system includes: a project server 150 including an issue management unit 151 managing histories of all issues which occur in the middle of performing a development project; a project management server 120 including a project replication unit 123; and an issue management server 180 providing a first issue selected by a developer of the development project among all issues which occur in the project server 150 in the middle of performing the development project to the project management server 120. In this case, the project replication unit 123 is configured to generate a replicated server 150' replicating all data of an OS of the project server 150 generating the first issue and an upper layer of the OS.

In this case, the issues management server 180 may include an issue management interface 181 for an issue manager who manages the issue management server 180. In addition, the issue management server 180 may be configured to acquire a configuration of a system on module (SOM) to which a code or a binary generated by the development project should be provided in addition to the first issue, and in order to analyze the first issue, the replicated server 150' and a test SOM having the same configuration as the SOM may be to be used by another engineer or an external expert other than the developer.

In this case, when an analysis result of the first issue analyzed by the another engineer or the external expert is input into the issue management interface 181, the analysis result of the first issue may be configured to be provided to a developer terminal 300.

In this case, the analysis result of the first issue may be configured to be provided to the developer terminal 300 through the project server 150.

In this case, the cloud platform development system may further include a project management interface 124 for an interaction between a developer who accesses the project management server 120 through the developer terminal 300, and the project management server 120, and an interaction between the another engineer or the external expert. In addition, when an analysis result of the first issue analyzed by the another engineer or the external expert is input into the project management interface 124, the analysis result of the first issue may be configured to be provided to a developer terminal 300.

In this case, the analysis result of the first issue may be configured to be provided to the developer terminal 300 through the project server 150.

In this case, the cloud platform development system may further include a project management interface 124 for an interaction between a developer who accesses the project management server 120 through the developer terminal 300, and the project management server 120. I addition, when the developer generates the development project by using the project management interface 124, the project management server 120 may be configured to prepare the project server 150 in order to support execution of the development project, and the project server 150 may include a user interface 153 which supports the developer to perform the development project.

In this case, when the developer generates the development project by using the project management interface 124, the project management server 120 may be configured to prepare the project server 150 by using some of computing resources which exist on a cloud 500, the project management server 120 may further include a project identification unit 121 and a project resource identification unit 122, and the project identification unit 121 may be configured to identify the development project among a plurality of projects formed in the platform 100 based on information included in the first issue when receiving the first issue from the management server 180 and the project resource identification unit 122 may be configured to identify resources on the cloud 500 constituting the project server 150 when the project identification unit 121 identifies the development project, the project replication unit 123 may be configured to generate the replicated server 150' based on the resources on the cloud 500 identified by the project resource identification unit 122, and the replicated server 150' may be prepared by using some other resources among the computing resources which exist on the cloud 500.

In this case, the cloud development platform system may further include another project server. In addition, the issue management server 180 may be configured to manage a plurality of issues transmitted from the respective project servers to the issue management server 180 among the issues which occur in one set of project servers including the project server 150 and the another project server, and the issue management server 180 may include the issue management interface 181 for the issue manager who manages the issue management server 180, and the issue management server 180 may be configured to provide the issue selected by the issue manager to the project management server 120 through the issue management interface 181.

In this case, the cloud development platform system may further include a source server 110 and a resource pool server 170. In addition, the project server 150 may further include a user interface 153 which supports the code/configuration management unit 152 and the developer to perform the development project, and the code/configuration management unit 152 is configured to transfer the request of the developer input through the user interface 153 to the source server 110, the source server 110 may be configured to acquire the source matching the request of the developer among the resources stored in the resource pool server 170 and provide the acquired source to the project server 150, and the code/configuration management unit 152 may be configured to provide the source provided from the source server 110 to the developer terminal 300 used by the developer in the form of the code or the binary.

In this case, the developer may select the selected first issue by using the project server 150, and the replicated server may replicate an OS image of the project server 150 and all data of an upper layer thereof.

Advantageous Effects

According to the present invention, provided is an effect that when a software developer who is vulnerable to hardware development reports issues which are revealed in the process of a development project to a platform provided according to the present invention, the platform reproduces a development environment by replicating all issue histories which occur in the process of the development project in addition to a server and a SOM used during the development process in order to resolve the issues to allow another engineer or external expert other than the developer to analyze the issues.

DESCRIPTION OF DRAWINGS

FIG. 1 illustrates a structure of a cloud development system provided according to an embodiment of the present invention.

FIG. 2 illustrates a configuration of a SOM provided according to an embodiment of the present invention.

FIG. 3 illustrates a configuration of a platform system provided according to an embodiment of the present invention.

FIG. 4 illustrates a configuration of a platform illustrated in FIG. 3.

FIG. 5 illustrates a configuration of a cloud development platform system having a function of replicating a project server, which is provided according to an embodiment of the present invention.

MODE FOR INVENTION

Hereinafter, an embodiment of the present invention will be described with reference to the accompanying drawings. However, the present invention is not limited the embodiment described in this specification, and may be implemented in various different forms. Terms used in the present specification are used to assist understanding of the embodiment, and are not intended to limit the scope of the present invention. Further, singular forms used herein will include plural forms as well, if the phrases do not clearly have the opposite meaning.

FIG. 1 illustrates a structure of a cloud development system provided according to an embodiment of the present invention.

A cloud development system 1 according to an embodiment of the present invention may include a platform 100, a local developer terminal 300, and a system on module (SOM) 200.

The platform 100 may include one set of servers. The one set of servers may be constituted by one server or a plurality of servers.

The local developer terminal 300 may be a terminal for a developer connected to the platform 100 through a network. The local developer terminal 300 may be locally connected to the SOM 200.

The SOM 200 as a hardware device may receive firmware and software required for an operation of the SOM 200 from the local developer terminal 300. That is, the SOM 200 is hardware which is or may be equipped with the firmware/software.

The local developer terminal 300 may develop the firmware and the software to be provided to the SOM 200 by accessing the platform 100, and download the developed firmware and software from the platform 100. The local developer terminal 300 may provide the downloaded firmware or software to the SOM 200.

FIG. 2 illustrates a configuration of a SOM provided according to an embodiment of the present invention.

The SOM 200 may include components such as a CPU 210, a ROM 211, a RAM 212, an RF/connectivity module 230, a power supply unit 220, a HAL 240, a sensor 250, an actuator 251, and memories 261 to 264. A specification of each component may be changed according to the SOM 200 of each component.

The memory may be divided into a first memory area 261 storing a boot loader and an OS, a second memory area 262 storing a security code, a third memory area 263 storing software which is dependent on the firmware and the hardware, and a fourth memory area 264 storing application software constituted only by a logic operation.

In an embodiment, the software stored in the third memory area 263 may include a function of sending and receiving a command/data to and from the firmware or the hardware. Unlike this, the software stored in the fourth memory area 264 may not include the function of sending and receiving the command/data to and from the firmware or the hardware.

The firmware of the third memory area 263 may be, for example, a driver for an LTE chip, a driver for touch sensing and an input chip, etc.

The software of the third memory area 263 may include a library associated with the hardware, for example.

The sensor 250 and the actuator 251 may be connected to a machine device not illustrated, which operates jointly with the SOM 200. The machine device may be, for example, various devices such as a machine device constituting various IoT devices installed in an infrastructure facility or a machine device constituting a transportation means for a single person.

The SOM 200 may be a device which becomes an independent transaction target. The SOM 200 may be provided to various developers who intend to develop various devices which is implementable by using the same.

The developers may select resource build codes which should be stored in the first memory area 261, the second memory area 262, and the third memory area 263 in the SOM 200 from the platform 100 through the local developer terminal 300. The SOM 200 may receive the selected resource build codes from the platform 100 through the local developer terminal 300.

The developer may not need to directly develop specific contents of the resource build codes which should be stored in the first memory area 261, the second memory area 262, and the third memory area 263.

A combination of the resource build codes which should be stored in the first memory area 261, the second memory area 262, and the third memory area 263 may depend on a specific configuration of the SOM 200 used by the developer. When the specific configuration of the SOM 200 used by the developer is designated, the platform 100 may determine the combination of the resource build codes which should be stored in the first memory area 261, the second memory area 262, and the third memory area 263 and build the determined combination as one resource build code, and provide the resource build code to the developer. The developer may provide the built resource build code to the SOM 200 through the local developer terminal 300.

For example, the specific configuration of the SOM 200 may depend on a boot loader, firmware, an OS, security level, software type and version, hardware installed in the SOM 200, and a peripheral device.

The developers may develop an app build code which should be stored in the fourth memory area 264 in the SOM 200 in the platform 100 through the local developer terminal 300. The SOM 200 may receive the developed app build code from the platform 100 through the local developer terminal 300.

In an embodiment, when the CPU 210 is an MCU, RTOS may be coupled. In addition, in this case, an RTOS based app may be stored in the third memory area 263 and the fourth memory area 264.

In another embodiment, when the CPU 210 is an MPU, Linux or a homogeneous OS may be coupled. In addition, in this case, a Linux based app may be stored in the third memory area 263 and the fourth memory area 264.

FIG. 3 illustrates a configuration of a platform system provided according to an embodiment of the present invention.

The local developer terminal 300 may access the platform 100 through the network. The developer terminal 300 and the platform 100 may send and receive the command and the data, and the developer terminal 300 may provide executable binary data to the SOM 200.

In an embodiment, the cloud 500 may be provided by an operator different from an operator who provides the platform 100 and the SOM 200. The operator who provides the cloud 500 may operate servers and devices therefor.

The operator who provides the platform 100 may rent and use a computing resource such as a server required for configuration of the platform 100 from the operators who provide the cloud 500. The platform 100 may be completed by using the rented computing resource and another computing resource provided by the operator who provides the platform 100.

FIG. 4 illustrates the configuration of the platform illustrated in FIG. 3.

The platform 100 may be a computing system including a resource server 110, a build server 160, a project server 150, a project management server 120, and an issue management server 180.

The resource server 110 may provide a resource pool 170 including resources which enable various configurations which the SOM 200 may have to operate. A size of the resource pool 170 may reach a size of dozens to hundreds of terabytes or more, for example. The resource pool 170 may be referred to as a resource pool server or a resource pool database.

Hereinafter, an embodiment in which the developer performs the development by using the platform 100 will be described.

The developer may access at least one of the resource server 110, the project management server 120, the project server 150, the build server 160, and the issue management server 180 included in the platform 100, and the access may be achieved through the developer terminal 300.

A server that permits the access of the developer among various servers included in the platform 100 may provide a user interface for the developer.

The developer may generate an account for the developer by accessing the project management server 120.

The developer may generate a first project for developing an app to be executed in the SOM 200 by accessing the project management server 120.

The project management server 120 may define, prepare, and provide a project server generated by using the resource of the cloud 500 so that the developer may execute the first project. The project management server 120 may perform a task of renting various computing resources provided by the cloud 500 in order to prepare and provide the project server.

Hereinafter, for convenience of description, the project server defined and prepared for the first project will be referred to as the project server 150.

When the first project is generated, the project server 150 may be prepared from the generation time, and a use history and a log history for the first project may be stored in the project server 150.

The project management server 120 may provide an independent project server for each of different projects generated by the same developer. Further, the project management server 120 may provide the independent project server for each of different projects generated by different developers. In FIG. 4, for convenience, only one project server 150 for the first project is illustrated.

The project server 150 may include an issue management unit 151, a code/configuration management unit 152, and a user interface 153.

The user interface 153 may be provided in various schemes such as a command line interface and a graphic user interface.

When the project server 150 is generated, the developer may perform the first project through the user interface 153. The developer may input a command including a configuration and a code required for the first project through the user interface 153.

Based on the command which the developer inputs through the user interface 153, the project server 150 may request the resource server 110 to select and provide the resource required for executing the first project from the resource pool 170.

The command input by the developer may include a configuration of hardware constituting the SOM 200 used by the developer and a command of requesting providing of the firmware and the software which should be provided to the SOM 200.

The configuration of the hardware may include, for example, information on the type and the version of hardware. Further, all of the firmware and the software which should be provided to the SOM 200 may be dependent on the configuration of the hardware. When the configuration fluctuates, a combination of libraries provided to the developer may be changed.

For example, when the developer generates the first project using the SOM 200, the developer may input a library required for the first project and a command of requesting providing of the driver.

For example, the SOM 200 used by the developer may include WiFi and Ethernet hardware, and the developer may intend to use only the WiFi of them. In this case, the developer may not request a driver for the Ethernet. Further, if for example, a mesh function among WiFi functions is not required, a WiFi resource which may be provided by the resource pool 170 may be lightened through a configuration process of removing the mesh function, and then a lightened WiFi driver may be provided to the developer. The configuration process may be executed by the project server 150 or the resource server 110.

The resource server 110 may select resources requested by the developer from the resource pool 170 and provide the selected resources to the project server 150, and the project server 150 may maintain the resources as they are or process the resources, and provide the resources to the developer terminal 300.

The developer may also receive the resource provided from the resource pool 170 from the project server 150 as source code and configuration forms.

Further, the developer may also receive the resource provided from the resource pool 170 from the project server 150 as a form of building the source code and the configuration.

Further, the developer may also receive the library and the driver provided from the resource pool 170 from the project server 150 as a code form or a binary form.

In addition, the developer may also receive an app which the developer himself/herself develops in the project server 150 from the project server 150.

Further, the command input by the developer may include a code which should be input for developing software which is not dependent on the configuration of the hardware as the software which should be provided to the SOM 200.

The code/configuration management unit 152 may transmit code and/or binary data provided by the resource server 110 to the developer terminal 300.

Alternatively, the code/configuration management unit 152 may transmit code and/or binary data processed and generated by the project server 150 to the developer terminal 300. Here, the binary data may mean data of a form executable by the SOM 200. In addition, the code and/or binary data processed and generated by the project server 150 may be code and/or binary data generated by processing the code and/or binary data provided by the resource server 110.

In this case, the code and/or binary may be the library or the app.

The project server 150 may use the build server 160 in order to perform building using the code and/or binary data provided by the resource server 110.

In this case, the build server 160 may also be provided conceptually integrally with the project server 150.

Alternatively, the build server 160 may also be provided independently from the project server 150. In this case, when the project server is replicated, the build server corresponding thereto may also be replicated. The build server may be replicated for each user according to a purpose thereof. Since the build process is a task of requesting the use of a CPU resource, it is difficult for a second developer to execute the build process by using the CPU while a first developer performs the build process by using the CPU. In this case, the build server may be virtually replicated and used for the second developer. The project server may be constituted only by less computing resources than the build server. Therefore, the independent project server may be provided for each project, but it is difficult to provide the build server for each project.

The issue management unit 151 may store (some or) all issues which occur after the project server 150 is defined and generated and while the developer develops the first project in a storage space therein. The issues may include the use history and the log history. In order to store all issues which occur while developing the first project in the storage space therein, a storage of the project server 150 should be able to a large value.

The developer may monitor the issues which occur in the project server 150 through the developer terminal 300 during a progress process of the first project. The developer may select an issue in which the developer is interested among the issues and transmit the issue to the issue management server 180 through the user interface 153.

For example, the issue in which the developer is interested may be an issue selected at the time when the trouble-shooting is required while executing the first project. For example, when it is assumed that an error occurs during the build process for performing the first project and in a case where the developer may not solve the error, the developer may select the issue for the error for the build and have a need for requesting back tracking to another expert. Meanwhile, unlike this, the issue in which the developer is interested may also be an issue selected due to another reason.

Hereinafter, for convenience of description, it is assumed that the issue in which the developer is interested may be an issue to be solved, which is the issue selected at the time when the trouble-shooting is required while executing the first project.

A manager who manages the issue management server 180 may be a person different from the developer which is the user of the developer terminal 300. The manager who manages the issue management server 180 may be a person who participates in providing a service provided by the platform 100. That is, the manager who manages the issue management server 180 may be a person who is employed by a company providing the platform 100.

The issue management server 180 may receive a plurality of issues from the project server 150 and other project servers other than the project server 150. That is, one issue management server 180 may manage issues transmitted from a plurality of different project servers.

When the manager of the issue management server 180 selects the issue to be solved among the plurality of issues, the issue management server 180 may provide the issue to be solved to the project management server 120.

The project management server 120 may include a project identification unit 121, a project resource identification unit 122, a project replication unit 123, and a project management interface 124.

The project identification unit 121 may identify a project in which the issue to be solved occurs based on information including the received issue to be solved. For example, the project identification unit 121 may identify that the project in which the issue to be solved occurs is the first project based on the received issue to be solved.

The project resource identification unit 122 may check with which resources among the resources of the cloud 500 for the project server 150 for the identified first project is provided.

The project replication unit 123 may generate a replicated server 150' which is a server replicating all data of an OS of the project server 150 checked by the projection resource identification unit 122 and an upper layer of the OS.

A function of the project replication unit 123 may be executed by the manager who manages the project management server 120. The manager may judge whether the replication of the first project is required in order to solve the received issue to be solved, and when it is judged that the replication of the first project is required, the project replication unit 123 may generate the replicated server 150' by a manipulation of the manager.

The replicated server 150' may also be generated within the cloud 500 or also locally generated.

All data of the OS of the project server 150 and the upper layer of the OS may include the use history/log history generated in the process of performing the first project.

Now, since the replicated server 150' includes all data of the same OS as the project server 150 and the upper layer of the OS, it may be appreciated that the replicated server 150' has the same development environment as the project server 150. Further, since the replicated server 150' includes the same use history/log history as the project server 150, a situation of the trouble-shooting faced by the developer may be reproduced as it is.

The project management interface 124 is used? for an interaction between a developer who accesses the project management server 120 through the developer terminal 300, and the project management server 120, and an interaction between the another engineer or the external expert and the project management server 120.

FIG. 5 illustrates a configuration of a cloud development platform system having a function of replicating a project server, which is provided according to an embodiment of the present invention.

A cloud development platform system 1 provided according to one viewpoint of the present invention may include a project server 150 including the issue management unit managing histories of all issues which occur in the middle of performing a development project, a project management server 120 including a project replication unit 123, and an issue management server 180 which provides a first issue selected by the developer through the project server 150 among all issues which occur in the middle of performing the development project in the project server 150 to the project management server 120.

The issues management server 180 may include an issue management interface 181 for an issue manager who manages the issue management server 180.

In this case, the project replication unit 123 may be configured to generate a replicated server 150' replicating all data of an OS of the project server 150 generating the first issue and an upper layer of the OS.

To this end, the project replication unit 123 may identify a computing resource in the cloud 500 constituting the project server 150. In addition, the project replication unit 123 may generate, in the cloud 500, the replicated server 150' replicating all data of the OS of the project server 150 and the upper layer of the OS based on the identified computing resource. Here, all replicated data may include (some or) all issues which occur while the developer develops the first project in the project server 150. The issues may include the use history and the log history.

The replicated server 150' may not be a server used by the developer who generates the first project. The replicated server 150' may be a server used by an engineer employed by a company which operates the platform 100 or an external expert employed by the company. The engineer or the external expert employed by the company which operates the platform 100 may access the replicated server 150', and analyze the first issue selected by the developer and report the analyzed result. The report may be transmitted to the replicated server 150', the issue management server 180, the project management server 120, or the project server 150, and finally transferred to the developer. Therefore, a report acquired analyzed by the first issue in which the developer is interested in the middle of performing the first project may be provided to the developer.

By the replication method of the project server provided according to an embodiment of the present invention, the engineer or the external expert may access an environment which is the same as the project environment performed by the developer and a history which is the same as a progress history of the project. Accordingly, an effect of the present invention is that an environment capable of providing an accurate report for the first issue may be provided to the developer. The engineer or the external expert uses the replicated server 150' and jointly uses an SOM which is the same as the SOM 200 used by the developer to substantially equally implement the development environment used by the developer.

According to the present invention, for example, when the developer fails in the build in the process of performing the first project, another expert may intend to equally reproduce the development environment and a project history in order to find a failure cause of the build. To this end, in an embodiment of the present invention, a replication server may be generated by replicating the project server 150 used by the developer. In this case, if a version of a replicated OS, a version of a replicated compiler, and a version of a replicated library which exist in the replication server are not all the same as a version of an original OS, a version of an original complier, and a version of an original library which exist in the project server 150, the failure cause of the build may not be found even though the another expert uses the replication server. The replication of the project server provided according to an embodiment of the present invention may be useful when the another expert may not use the project server 150. The reason is that it is inappropriate that the another expert other than the developer uses the project server 150 according to a use contract of the platform 100 of the developer.

By using the embodiments of the present invention, those who belong to the technical field of the present invention will be able to easily perform various changes and modifications within a range without departing from essential characteristics of the present invention. Contents of each claim of the claims may be combined with another claim which does not have a citation relationship within a range which may be understood through this specification.

The invention claimed is:

1. A cloud development platform system comprising:
   a project server including an issue management unit configured to manage histories of hardware issues which occur in a development project;
   a project management server including a project replication unit;
   an issue management server configured to provide a first issue selected by a developer of the development project from among the hardware issues to the project management server; and
   a source server and a resource pool server,
   wherein the project replication unit is configured to generate a replicated server replicating data of an operating system (OS) of the project server and an upper layer of the OS,
   wherein the issue management server includes an issue management interface,
   wherein the issue management server is configured to acquire a configuration of a system on module (SOM) used by the developer for the development project,
   wherein the issue management interface is configured to:
   in response to an analysis result of the first issue analyzed by another engineer or an external expert based on a test SOM having a same configuration as the configuration of the SOM being input into the issue management interface, transmit the analysis result of the first issue to a developer terminal used by the developer,
   wherein the configuration of the SOM includes a type and a version of hardware of the SOM, and a combination of libraries provided to the developer,
   wherein the project server further includes a user interface configured to support a code/configuration management unit and the developer to perform the development project,
   wherein the code/configuration management unit is configured to transfer a request of the developer input through the user interface of the project server to the source server,
   wherein the source server is configured to acquire a resource matching the request of the developer from among resources stored in the resource pool server and provide the resource to the project server, and
   wherein the code/configuration management unit is configured to provide the resource provided from the source server to the developer terminal in a form of a code or binary.

2. The cloud development platform system of claim 1, wherein the analysis result is transmitted to the developer terminal via the project server.

3. The cloud development platform system of claim 1, further comprising:
   a project management interface for an interaction between a developer who accesses the project management server through the developer terminal, and the project management server, and an interaction between the another engineer or the external expert,
   wherein when an analysis result of the first issue analyzed by the another engineer or the external expert is input into the project management interface, the analysis result of the first issue is configured to be provided to a developer terminal.

4. The cloud development platform system of claim 1, further comprising:
   a project management interface configured to allow the developer to access the project management server through the developer terminal,
   wherein when the developer generates the development project by using the project management interface, the project management server is configured to prepare the project server in order to support execution of the development project, and
   wherein the project server includes a user interface configured to support the developer to perform tasks related to the development project.

5. The cloud development platform system of claim 4, wherein the development project is generated based on cloud computing resources.

6. The cloud development platform system of claim 1, further comprising:
   another project server,
   wherein the issue management server is configured to manage a plurality of issues transmitted from the project server and the another project server
   wherein the issue management server is configured to provide a selected issue related to the project server or the another project server to the project management server through the issue management interface.

7. The cloud development platform system of claim 1, wherein the developer terminal is configured to receive selected codes selected by the developer from among a combination of codes and store the selected codes in a first memory, a second memory and a third memory in the SOM.

8. The cloud development platform system of claim 7, wherein one or more of the selected codes are stored in the first memory area storing a boot loader and an OS, the second memory area storing a security code, and the third memory area storing software which is dependent on firmware and hardware based on the configuration of the SOM.

9. The cloud development platform system of claim 8, wherein the project management server is further configured to:
   in response to receiving a designation of the configuration of the SOM used by the developer, determine the combination of codes and provide the combination of codes to the developer terminal.

* * * * *